Dec. 2, 1969　　　S. ROBERTS　　　3,482,073
METHODS FOR WELDING SEAMS
Filed Aug. 12, 1966　　　4 Sheets-Sheet 1
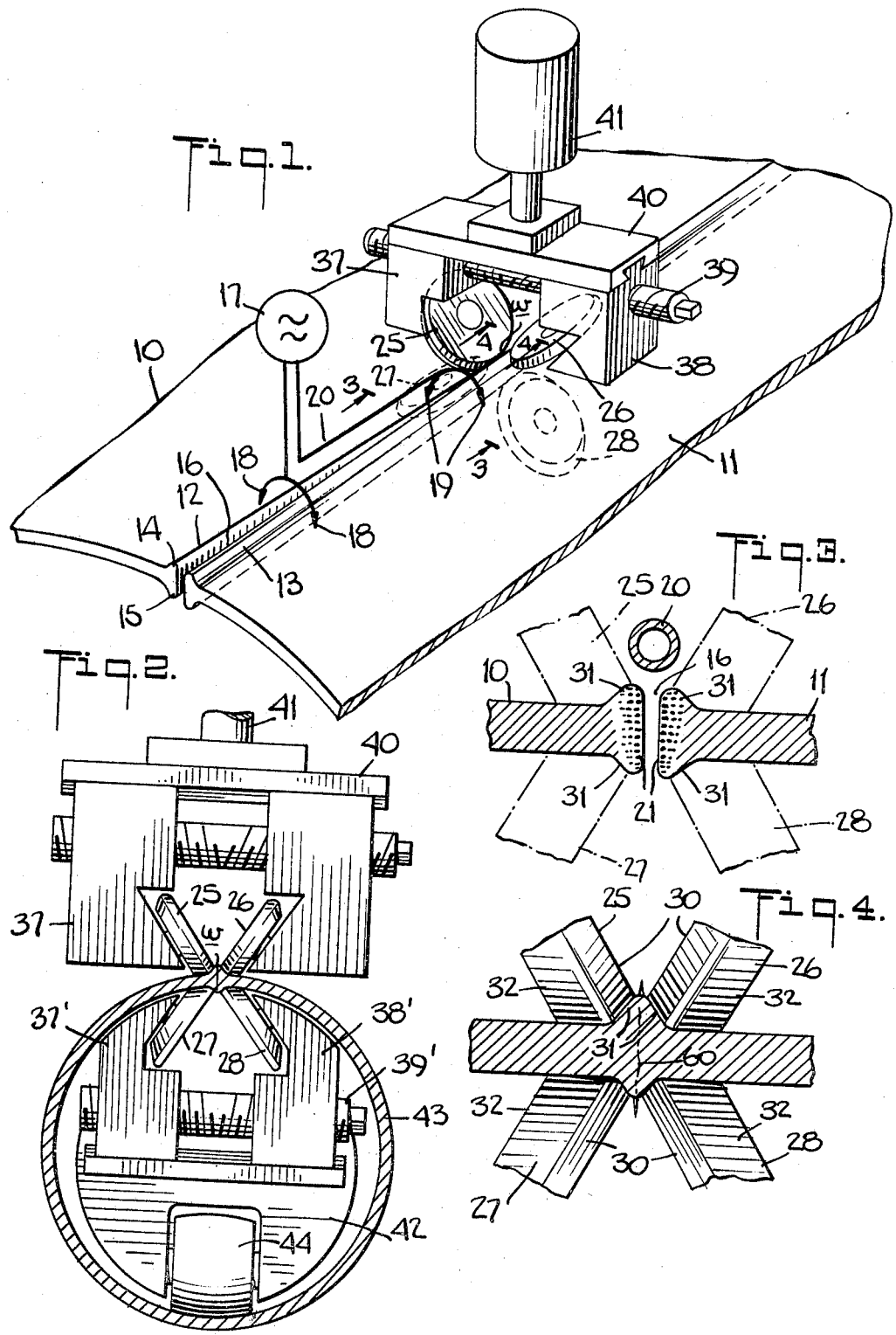

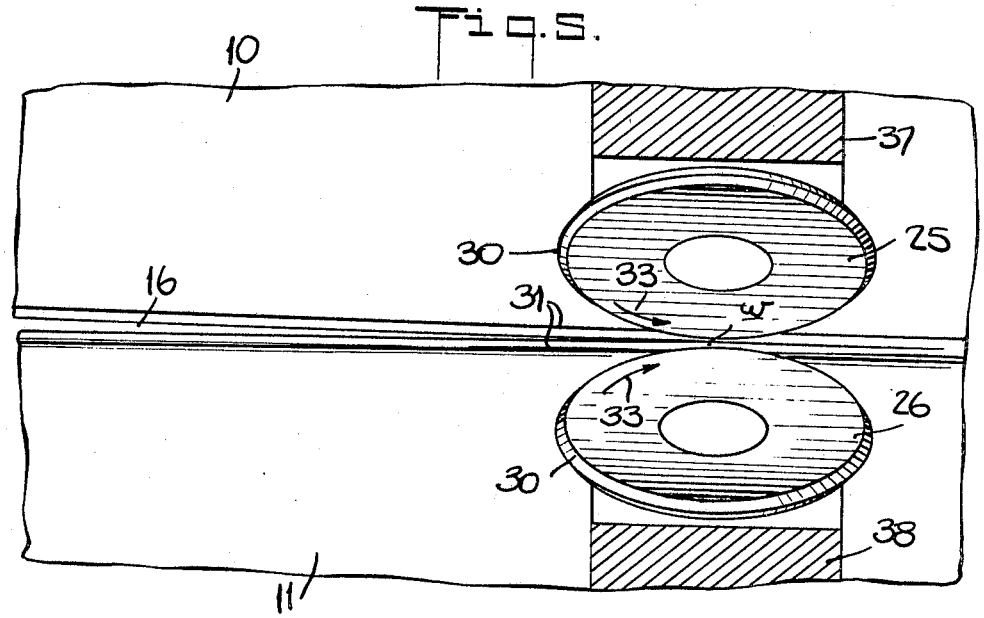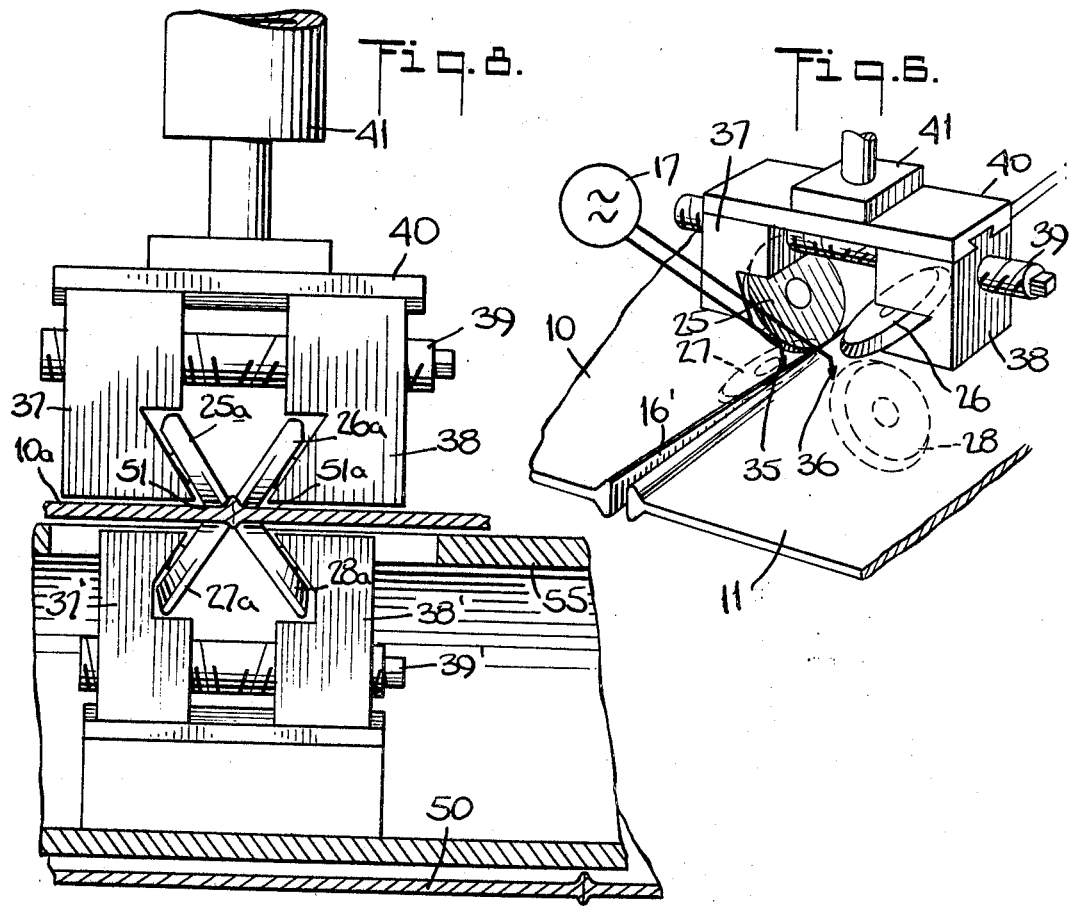

Dec. 2, 1969  S. ROBERTS  3,482,073
METHODS FOR WELDING SEAMS
Filed Aug. 12, 1966  4 Sheets-Sheet 3
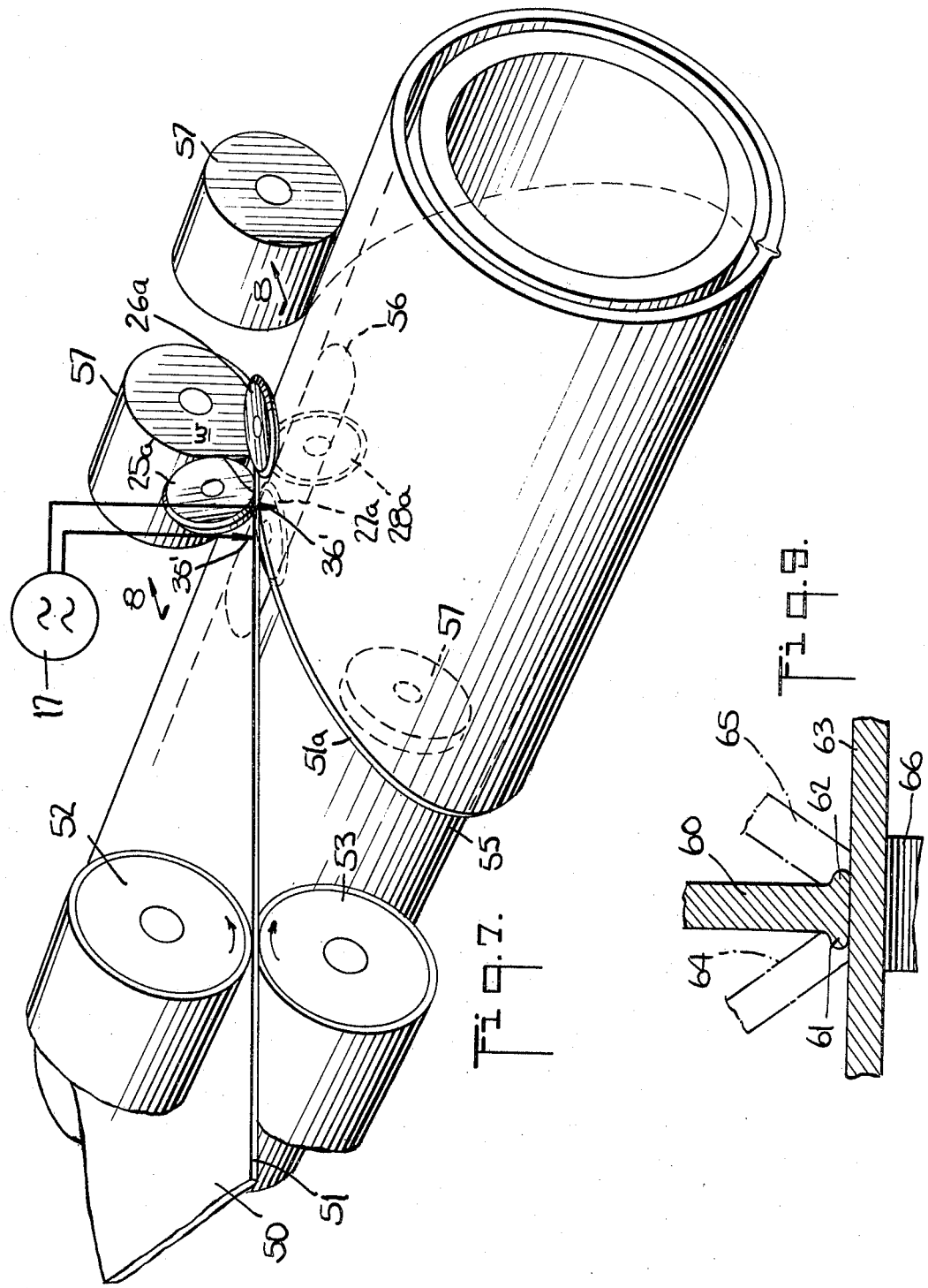

United States Patent Office 3,482,073
Patented Dec. 2, 1969

3,482,073
METHODS FOR WELDING SEAMS
Sidney Roberts, Flushing, N.Y., assignor to American Machine & Foundry Company, New York, N.Y., a corporation of New Jersey
Filed Aug. 12, 1966, Ser. No. 572,101
Int. Cl. B23k 31/06, 1/16, 11/30
U.S. Cl. 219—59                                    4 Claims

ABSTRACT OF THE DISCLOSURE

The edge of a metal portion to be welded to another metal portion is preformed to a bulging cross-sectional shape with an edge surface and an upstanding pressure receiving surface spaced from the edge surface and the edge surface and the other metal portion are heated to welding temperature by high frequency current as they are moved along a seam line and in contact at a weld point where they are pressed together by pressure applied to the other metal portion and to the pressure receiving surface which remains firm enough to receive forge welding pressure.

---

This invention relates to methods and apparatus for forming welded seams in the nature of butt welded seams between metal portions by the use of high frequency heating current. The invention is well adapted for forming longitudinal seams in the welding of tubing as well as helically-extending seams for tubing formed by helically winding a strip. The invention may be used in fact for welding metal portions of a variety of shapes, thicknesses or sizes, including welding together the edges of two independent strips of metal.

In making welds between the edges of metal portions in the nature of butt welds in various situations, difficulties are sometimes encountered in applying sufficient pressure in directions across the weld as the metal edges approach and pass the weld point; that is to say, sufficient pressure to insure a good substantially forged-type weld from which such parts of the metal as are heated to a softened or welding temperature as well as any slag or the like which may be present will be squeezed out from between the abutting edges while same are backed up under pressure by the adjacent solid or firm metal which is not heated to welding temperature.

In accordance with the present invention, each of the edges which is to be welded is caused to assume a bulging form. That is, the edges are each so preshaped that portions of the metal, say at the upper corner of an edge, bulge upwardly, and preferably also at the lower corner of the edge some of the metal bulges downwardly. Then at the weld point, pressure is applied preferably by the use of four rolls so positioned that two of them engage respectively the edge bulging portions on one metal member and above and below same to squeeze the bulge on that member both in horizontal and vertical directions toward the bulge on the opposed member, the bulge on which meanwhile is being squeezed by the remaining two rolls, one above and one below, in like manner but toward the bulge on the first member. In this way the bulges on the two members may be brought together into firm forge-welded relation and any slag or molten metal initially occurring between the bulges will be squeezed out as the four rolls act in effect to squeeze firmly together and reduce the total cross-section of the two bulges as they become welded.

While it has heretofore been attempted to form or preform abutting edges of metal portions with bulges to be welded together, the resulting weldments have, so far as is known, not been satisfactory. This was evidently because the pressure rolls used at the weld point were arranged either merely to press vertically against the abutting bulges without opportunity for sidewise pressure adequate to force them into welded engagement, or the peripheries of the rolls did not have surface areas such as to apply sideways pressure to force the bulges together.

With the present invention these difficulties are overcome and highly satisfactory weldments are secured between the bulges by (i) mounting the rolls so that they rotate respectively along inclined planes which intersect at the general region of the weld point, and (ii) forming the peripheries of the rolls so that each will present a pressure area toward the bulge which it engages, and another pressure area toward the unbulged metal just adjacent the bulge. The rolls in effect form a throat therebetween of such dimensions and the peripheries thereof are in effect so spaced that they will form such a throat of a size substantially to constrict and squeeze together the preformed bulges as they pass through and do so by constricting pressure having both horizontal and vertical components. With metal portions having preformed bulged edges of a particular predetermined size, the spacings of the rolls are so adjusted that they will conjointly act to constrict such size with adequate welding pressure in the two dimensions of the cross-section of the weld region.

In carrying out the invention using high frequency heating current, the current may be applied to the longitudinally advancing metal portions or strips in various ways, so that when the edges thereof are brought together at a weld point, they will have become heated to welding temperature. For example, the edges may be brought together with a V-shaped gap therebetween with the high frequency current applied by contacts engaging the strips in advance of the weld point to cause the current to flow from such contacts along the approaching gap edges to and from the weld point. Also, the edges in approaching the weld point, whether in contact or with a gap therebetween, may have the current applied thereto by one high frequency current contact located in advance of the weld point and the other at the region of the weld point, so that at any one moment the current flows in the same direction on the adjacent edges and may be caused to penetrate to the full depth of the edges by principles disclosed in the co-pending application of Wallace C. Rudd, Ser. No. 510,502, filed Nov. 30, 1965. Also, if preferred, the high frequency current may be applied by induction using a suitably-shaped induction coil to cause heating of the edges as they advance to the weld point.

In cases where the metal portions are brought together with a V-shaped gap in advance of the weld point and on the edges of which gap the high frequency current flows, the fact that the edges are bulged and become compressed together at the weld point makes it possible to close the gap at its apex while still advancing the two metal portions at a slight angle to each other (corresponding to the angle of the gap) without twisting or stretching the workpieces. For this reason the invention facilitates the welding of relatively thick or rigid workpieces. Also the fact that in such cases the compressing together of the bulges in effect closes the gap, is particularly advantageous in welding a helical seam on tubing where the gap occurs between the trailing edge of a previously formed convolution and the forward edge of a convolution about to be formed. Also it may be noted that the problem of butt welding such helical seams is minimized by the use of the invention, since the gripping and constriction of the abutting bulged edges at the weld point avoids the necessity of attempting to apply elsewhere any heavy edgewise pressure against the strip being helically wound to form the tubing.

Various further and more specific objects, features and advantages of the invention will appear from the descrip-

In the drawings:

FIG. 1 is a perspective and somewhat diagrammatic view illustrating one of the preferred forms of the apparatus;

FIG. 2 is a vertical sectional view of a somewhat similar embodiment arranged for the longitudinal welding of tubing;

FIG. 3 is a vertical sectional view taken substantially along line 3—3 of FIG. 1 and indicating the relationship of certain of the parts as well as the heating pattern on the edges which are to be welded;

FIG. 4 is a similar vertical sectional view taken substantially along line 4—4 of FIG. 1 and indicating the weld region just as a weldment is being made;

FIG. 5 is a view partially in section and looking down on the pressure rolls such as shown in FIG. 1;

FIG. 6 is a view similar to FIG. 1 but illustrating an alternative method of applying the high frequency heating current;

FIG. 7 is a perspective and somewhat diagrammatic view illustrating the application of the invention to the helical welding of tubing;

FIG. 8 is a sectional view taken substantially along line 8—8 of FIG. 7 and showing further details;

FIG. 9 is a vertical sectional view diagrammatically showing another embodiment.

Figure 10:
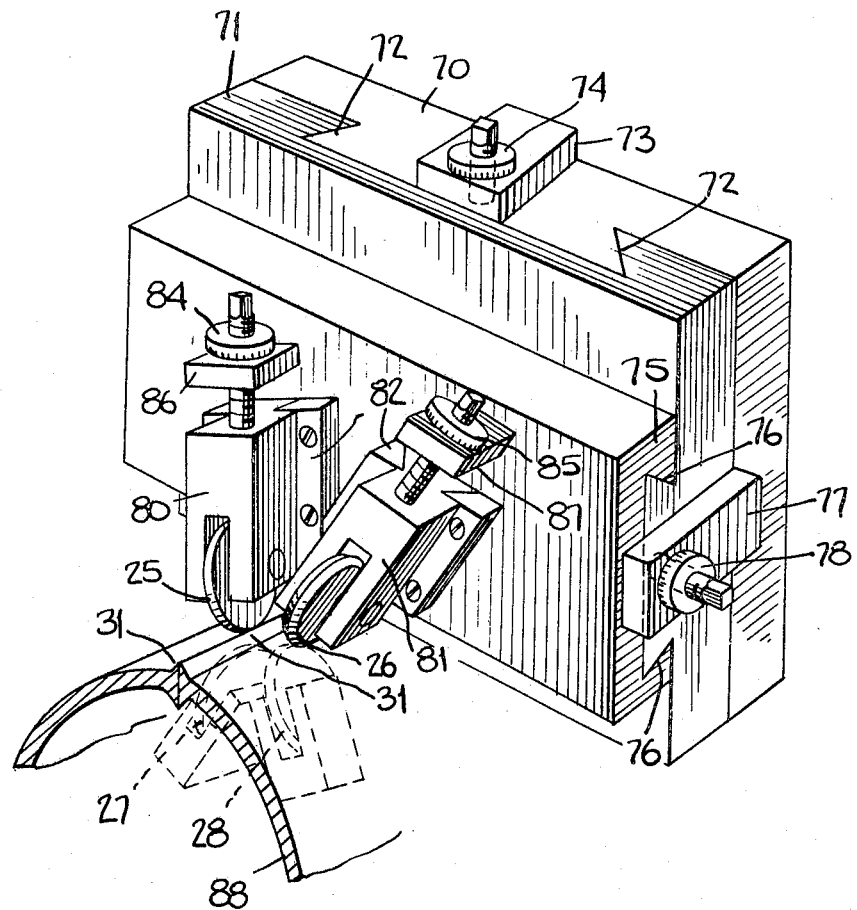
FIG. 10 is a perspective view of an alternative mounting means for pressure rolls.

Referring now to FIG. 1 in further detail, two metal portions are shown at 10 and 11 which are to be welded together along edges 12 and 13 thereon which have been preformed in any suitable manner as by the use of pressure rolls so as to have bulging cross-sections or beaded edges. Preferably as indicated, the cross-sections are such that bulging portions as at 14 and 15 respectively protrude both above and below the normal upper and lower surface of the workpieces. Preferably, although not necessarily in all cases, the bulge formations on the edges of each of the two members are alike, as shown.

The metal portions 10 and 11 may be suitably rapidly advanced longitudinally by any known means (not shown) and the bulging edges thereon may desirably be somewhat spaced apart with a gap 16 therebetween, which gap becomes closed upon formation of the weldment at the weld point, as indicated in FIG. 4. However, with the method of applying the high frequency current as shown in FIG. 1, the edges need not necessarily have a V-gap formation therebetween in advance of the weld point. In the example there shown, a source of high frequency current indicated at 17 is connected to contacts, as at 18, located substantially in advance of the weld point $w$ and also two other contacts, as at 19, located close to the weld point, or if preferred, the pressure rolls at the weld point may form the high frequency current contacts in lieu of separate contacts as at 18, 19. As indicated in FIG. 1, a portion of the high frequency circuit, as indicated at 20, forms a so-called "proximity conductor" extending along above the seam line. The current from the high frequency source thus extends to the contacts 18, thence along both of the edges which are to be welded, to the contacts 19 or the equivalent, thence back along the proximity conductor 20 to the high frequency source 17. The conductor portion 20 will serve to cause the high frequency current to be concentrated to the extent desired along on the bulging edge formations, and upon use of appropriate high frequency, the current paths may extend down and cause heating of the facing portions of the bulging edges, as indicated by the dotted areas 21 in FIG. 3, throughout the depth.

The contacts 18, 19 and circuit connection thereto should, of course, be suitably fluid-cooled as is customary with high frequency current connections.

As indicated in FIGS. 1 to 4, the bulging edge formations at the weld point $w$ pass through a throat-like space between the peripheries of four rolls 25, 26, 27 and 28. As best shown in FIG. 4, each of these rolls has an annular surface area, as indicated at 30, which is positioned and shaped to roll against and apply heavy pressure to side surface areas, as at 31, on each protruding portion of the bulge formations on both workpieces. Also, at the same time, each of the rolls has preferably another annular peripheral surface, as at 32 (see FIG. 4) positioned to have rolling engagement under pressure against a surface area on the workpiece along and immediately adjacent the base of each protruding bulge portion. It will be noted that each of the side areas on the bulges forms, in connection with an adjacent normal surface area on the workpieces, a grooved or channel-like region into which the rolls, shaped as above described, press diagonally so as to apply a heavy force having a component directed generally vertically and another component directed generally horizontally toward the seam line. To accomplish this, it will be noted that each of the rolls is rotatable about an axis such that the rolls rotate in or along the planes which are inclined to the normal surfaces of the workpieces, such planes intersecting within, or in the general region of the weldment being formed.

FIG. 5, which is a view looking down upon the rolls 25, 26, for example, illustrates the manner in which the peripheral surface portions 30 thereon engage the bulge surfaces 31 and force the latter toward each other as well as downwardly. That is, as portions of the roll peripheries 30 come down and around in the direction of the arrows 33 into engagement with the bulge areas 31, the latter are crowded and squeezed toward each other forcefully, thereby not only closing any gap that may be present therebetween, but also forcing the heated opposed surfaces thereof into firm forged-welded relationship at the weld point $w$.

It may be noted that if the rolls 25, 26, for example, instead of rotating about diagonally positioned axes as shown, were mounted to rotate about a horizontal axis above the seam line, then the peripheral portions of rolls so mounted would come around and press vertically downward against the workpieces with no positive or direct component of force causing squeezing and compacting of the bulging edges together to make a satisfactory weld at the weld point. On the other hand, if the rolls were mounted on vertical axes at each side of the seam line, then the peripheral areas thereof could only apply pressure in directions across the seam line, leaving the bulging edge formations free from constriction in vertical directions so that then again the bulging formations would fail to be satisfactorily constricted and welded together.

As will be apparent from comparing FIGS. 3 and 4, while in advance of the weld point the edges of the metal portions may be spaced apart by a small gap 16, yet at the weld point, due to the squeezing together of the opposed surfaces of the bulging edges, the gap may become closed without altering the straight longitudinal line of travel of the workpieces through the throat of the welding apparatus. Thus the metal portions or strips need not necessarily change their direction of advance in any such way as might cause or necessitate stretching, wrinkling or distortion thereof. However, the edges of the metal portions as they are advanced may be brought into contact quite far in advance of the weld point, if preferred.

The alternative embodiment of the invention shown in FIG. 6, where the bulging edges are brought together with a substantial V-shaped gap 16' therebetween, is particularly advantageous if high frequency current from the source 17 is to be applied by contacts as at 35, 36, so that the current will flow from said contacts along the approaching gap edges to and from the weld point. With this current path, the current on opposite sides of the gap in advance of the weld point at any one moment will be flowing in opposite directions, so that by mutual inductance effects, the current and resulting heating will be more concentrated on the very surfaces within the area on the V-gap. In other respects, the arrangement of FIG. 6 may be like that of FIG. 1.

As further shown in FIG. 1, the rolls 25 and 26 respectively may be mounted on suitable bearing blocks 37 and 38. A shaft 39 may pass through these blocks, such shaft being threaded in opposite directions on its opposite ends so that upon rotating same the bearing blocks may be brought together or spaced further apart. Also suitable means, such as a strip 40, may be mounted to press down against the bearing blocks 37 and 38, the member 40 being supported as by any suitable means at 41, adjustable in height, or, if desired, the means 41 may take the form of a fluid pressure operated cylinder and piston means for applying downward pressure. In either case the member 40 will serve to hold the bearing blocks and consequently the rolls 25 and 26 at the desired elevation above the weld point. Similar bearing blocks, such as indicated in FIG. 2 at 37′, 38′ may be provided for the lower rolls 27 and 28, and the spacing of these may be adjusted as by a threaded rod 39′. This assembly may be carried on any suitable support 42, and in case a longitudinal seam is being welded on tubing, such as indicated at 43, the means 42 may be supported on a roll 44 rolling on the lower inside surface of the tubing as the latter advances.

With the embodiment for welding helically-formed tubing with a helical seam, as shown in FIGS. 7 and 8, an elongated metal strip, as at 50, having a bead or bulging edge as at 51, is suitably fed as by power-driven pusher rolls 52, 53 into tangential relation to the surface of the desired helical tube formation 54 and surrounding a suitable mandrel means as at 55. Both edges of the strip 50 are formed with the beaded or bulging cross-section so that the trailing edge as at 51a on one convolution, comes into engagement at the weld point w with the forward bulging edge 51 on the strip, the two edges approaching each other with a V-gap therebetween, to the opposite sides of which high frequency contacts as at 35′ and 36′ may be applied.

As shown in FIG. 8, four rolls as at 25a, 26a, 27a and 28a all similar to the corresponding rolls shown in FIG. 1, may be suitably mounted on bearing blocks 37, 38 and 37′, 38′ so that each roll engages a side surface of one of the bulges either on the inside or the outside of the tubing as the case may be. As in the case of FIG. 1, these rolls are mounted to rotate in inclined planes which intersect at the general region of the formed weldment. Each of the rolls has its periphery formed with two annular peripheral surface areas like those at 30 and 32 in FIG. 4. The mandrel 55 may be suitably recessed as at 56 to receive the supporting means for the under rolls 27a and 28a.

In FIG. 7, subsequent to the weld point, the exterior of the wound tubing may be suitably engaged by pluralities of pressure rolls, as indicated at 57 as examples. The mechanical details of construction and arrangement of FIG. 7 as to parts and features not herein specifically described, may, of course, conform to practices common to the art of manufacturing helically welded tubing.

With each of the embodiments, the vertical and horizontal spacings between the opposed rolls such as 25, 26, 27 and 28, are preferably so adjusted with respect to the dimensions of the bulges, that as two bulges approach the weld point, same will become not only forced together but somewhat constricted in two dimensions of the conjoint cross-sectional area thereof. Once the spacings of the rolls have been properly adjusted to correspond with workpieces having bulges of predetermined sizes, the rolls may remain with these spacings therebetween fixed until it is desired to use the equipment for workpieces with bulges of other dimensions, whereupon the spacings of the rolls, of course, may be readjusted appropriately.

While as shown in the drawings the rolls are each preferably formed with two distinct annular surface portions as at 30 and 32 (FIG. 4) and with a somewhat abrupt ridge where these surface portions meet, yet it will be understood that these surface areas may be formed so that the one will merge into the other with more or less of a curved cross-section and then in some cases the annular area 32 may be more or less omitted so long as the area 30 is shaped and positioned to apply pressure preferably with both vertical and horizontal components against the side surface areas of the bulges and do so without substantial cutting into such side surface areas.

When the current is applied by contacts positioned for example as shown in FIGS. 6 and 7, frequencies may desirably be used from a lower range in the neighborhood of 50,000 cycles per second and up to 300,000 to 400,000 cycles per second or higher. When the current is applied with contacts as of FIG. 1, lower ranges or frequencies may be used, if desired, although not necessarily, for example from a few thousand to 10,000 or higher, and if the current is to be inductively applied, the frequencies may desirably range from about 1000 to about 10,000 cycles per second or higher, depending upon the depth of the metal and its resistivity, and frequencies of this range may also be used with the arrangement of FIG. 1.

Certain aspects of the invention are applicable for forming so-called T welds, that is, for example, a weld between an edge of one metal strip, which edge has been preformed to a bulging cross-sectional shape and which is to be welded for example to a plain surface on another metal member. This is somewhat diagrammatically indicated in FIG. 9 showing in vertical cross-section a metal strip 60, having an edge preformed with bulges, as at 61, 62, extending to each side, and which edge it is desired to weld to the surface of a metal member 63. With this embodiment the members 60 and 63, here shown in transverse cross-section, are, of course, both advanced longitudinally so that the edge of member 60 comes into engagement with the surface of member 63 at least upon arriving at the weld point. Prior to the weld point high frequency current is caused to flow along the line of the desired welded seam along on the edge of member 60 and along on the surface of member 63 to heat same to welding temperature on reaching the weld point. At the weld point, pressure rolls, as at 64, 65, corresponding to the rolls 25 and 26 above described, are mounted to rotate in oppositely directed diagonal planes so that their peripheries engage areas on the bulges 61, 62 forcing same toward each other and downwardly in generally the same manner as the rolls 25, 26 act upon the bulge surface area 31 as above described. Meanwhile and particularly at the weld point, the member 63 may be supported by a roll, a portion of which is indicated at 66, or otherwise supported. This embodiment is particularly advantageous in cases such as where in the manufacture of welded structural shapes, it is desired to weld the edge of a web member (as at 60) to the surface of a flange member, (as at 63). In making such welded structural shapes, on some occasions the web piece may be of quite extended width, and may even be as much as several feet in width. It such cases it would be impractical to apply the pressure at the weld point across the whole width of such a web, but with the arrangement as shown in FIG. 9, using the preformed bulging edge, such edge may be squeezed into welded engagement with the flange piece effectively with the roll arrangement as shown.

In some cases difficulties may be encountered in controlling the alignment of the bulging edge or edges to be welded, and in order to meet a variety of varying conditions with various types of workpieces, a more refined arrangement for controlling the positions of the pressure rolls may be desirable, such as shown in FIG. 10. Here a suitably-mounted rigid block, as at 70, is arranged to carry a vertically-adjustable block 71, these two blocks being formed with cooperating slideway portions as at 72. The block 70 has a portion 73 overhanging the block 71. Portion 73 carries a suitable vernier adjustable screw means 74 for adjusting vertically the position of block 71.

Block 71 is arranged to carry another mounting block 75, the blocks 71 and 75 having cooperating slideway portions as at 76 permitting slidable adjustment in horizontal directions of the block 75 on block 71. To this end the block 71 may carry a portion 77, which in turn carries suitable adjustable vernier screw means 78 for slidably adjusting the block 75 in horizontal directions, as desired. Pressure rolls as at 25, 26 are provided as in the above-described embodiments, and these respectively are mounted to rotate in blocks 80 and 81. The latter blocks and the face of block 75 are provided with cooperating slideway portions, as at 82, permitting slidably adjustable movement of the blocks 80 and 81 and consequently also adjustment of the rolls 25 and 26 in opposite diagonal directions. For this purpose suitable adjustable vernier screw means, as at 84 and 85, carried by lugs 86 and 87, are provided at the front of block 75.

In the particular example shown in FIG. 10, the workpiece comprises a tube 88, shown in section, and which is, of course, being advanced past the weld point at the region of the squeeze or pressure rolls 25, 26, which engage the surface areas on the bulges 31 adjacent the desired seam line therebetween. Thus with this arrangement the position of the rolls 25, 26 may be adjusted vertically by the vernier screw means 74 and horizontally by the vernier screw means 78. Furthermore, by the vernier screw means 84 and 85 respectively, the positions of rolls 25 and 26 may be adjusted independently and relative to each other and to the bulges on the workpieces and in diagonal directions, so that there may be a vertical as well as a horizontal component of movement of each roll during its adjustment. This enables the rolls in effect to pull the bulges 31 toward each other with such pressure as may be desired or necessary to form the weldment therebetween, at the same time crowding the region of the weldment downwardly somewhat.

On the underside of the desired seam line, the pressure rolls 27, 28 may either be mounted as hereinabove described or, if preferred and if there is space available, the arrangements for adjusting same may be like that above described and shown in FIG. 10 for the rolls 25, 26. The mounting means as shown in FIG. 10 for the rolls 25, 26 may also be used with rolls such as 64 and 65 in FIG. 9.

It will be understood that the term "weld point" is used herein for convenience, although actually the abutting bulging edges when brought together under pressure become welded along a vertical line or area, as best indicated at 60 in FIG. 4. Also, the term "seam line" is used herein for convenience, but actually the weldment is formed along a band represented by the surface areas of the two edges as forced together. Furthermore, it will be appreciated that the apparatus as shown in the various figures may be oriented in various positions, and that terms such as "upper" and "lower" are used herein merely for convenience in referring to the parts in the positions and orientation as shown.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding together two elongated metal portions at their edges, each portion having a thickness which is small relative to its width and having upper and lower surfaces extending in the length and width directions, said method comprising increasing the thickness of the metal at each edge by forming the edge of each metal portion so as to have a bulging cross-sectional shape which, in cross section, has a pair of portions protruding respectively above and below the levels of said upper and lower surfaces and has a substantially linear portion extending in the direction of the thickness of the metal portion at least from said level of said upper surface to at least said level of said lower surface which forms a relatively flat edge surface having a height at least equal to the thickness of the metal portion, said pair of protruding portions providing a pair of pressure-receiving surfaces upstanding respectively from said upper and lower surfaces and spaced from said edge surface and running lengthwise of the metal portion; advancing said so-formed edges toward a weld point in spaced-apart but close relation with said linear portion of one said edge substantially parallel to the linear portion of the other said edge and bringing said edge surfaces into contact at said weld point; causing high frequency current to flow on said edges in advance of the weld point with a magnitude and for a time sufficient to heat said edge surfaces in advance of reaching said weld point and to heat said edge surfaces to welding temperature upon reaching said weld point while maintaining said pressure-receiving surfaces sufficiently firm to permit the application of forge welding pressure thereto; and at the weld point, subjecting said pressure-receiving surfaces to pressure directed so as to force said edge surfaces against each other as they approach the region of the weld point and to weld said edges together with a weld having, in cross section, a height at least equal to the thickness of an adjacent metal portion.

2. Method for welding together an edge of a first elongated metal portion to a relatively flat surface on a second elongated metal portion, said first portion having a thickness which is small relative to its width and having upper and lower surfaces extending in the length and width directions, said method comprising increasing the thickness of the metal at said edge of said first portion by forming said edge so as to have a bulging cross-sectional shape which, in cross section, has a pair of portions protruding respectively above and below the levels of said upper and lower surfaces and has a substantially linear portion extending in the direction of the thickness of the metal portion at least from said level of said upper surface to at least said level of said lower surface which forms a relatively flat edge surface having a height at least equal to the thickness of the first metal portion, said pair of protruding portions providing a pair of pressure-receiving surfaces upstanding respectively from said upper and lower surfaces and spaced from said edge surface and running lengthwise of the metal portion; advancing said so-formed edge and said surface of said second metal portion toward a weld point in spaced-apart but close relation with said linear portion of one said edge substantially parallel to said surface of said second metal portion and bringing said edge surface and said surface of said second metal portion into contact at said weld point; causing high frequency current to flow on said edge and said last-mentioned surface in advance of the weld point with a magnitude and for a time sufficient to heat said edge surface and said surface of said second metal portion in advance of reaching said weld point and to heat said edge surface and said surface of said second metal portion to welding temperature upon reaching said weld point while maintaining said pressure-receiving surfaces sufficiently firm to permit the application of forge welding pressure thereto; and at the weld point, subjecting said pressure-receiving surfaces and said second metal portion to pressure directed so as to force said edge surface and said surface of said second metal portion against each other as they approach the region of the weld point and to weld said last-mentioned surfaces together with a weld having, in cross section, a height at least equal to the thickness of said first metal portion.

3. Method in accordance with the foregoing claim 1 for welding a helical seam on tubing while winding an elongated strip helically to form the convolutions of the tubing, and in which method one of said edges with the bulging cross-sectional shape comprises the trailing edge of a formed convolution and the other of said edges with the bulging cross-sectional shape forms the forward edge of the strip for forming a succeeding convolution, said pressure as applied to the pressure receiving surfaces at the protruding bulge portions respectively acting to force the convolutions into edge-to-edge welded engagement.

4. Method in accordance with the foregoing claim 2 and in which the metal portion having an edge of bulging cross section is welded to the surface of the other metal portion to form a structure having a T-shaped cross section at the region of the weldment.

References Cited

UNITED STATES PATENTS

| | | | |
|---|---|---|---|
| 2,025,741 | 12/1935 | Hansen | 219—67 |
| 2,240,170 | 4/1941 | Borgadt | 219—67 |
| 3,410,982 | 11/1968 | Morris et al. | 219—105 X |

JOSEPH V. TRUHE, Primary Examiner

B. A. STEIN, Assistant Examiner

U.S. Cl. X.R.

219—64, 67, 105, 107